US005082562A

United States Patent [19]

Burger

[11] Patent Number: 5,082,562

[45] Date of Patent: Jan. 21, 1992

[54] DEHYDRATION PRESS

[76] Inventor: Raymond Burger, 7 place de la Fleur, 68160 Sainte Marie Aux Mines, France

[21] Appl. No.: 566,948

[22] Filed: Aug. 13, 1990

[30] Foreign Application Priority Data

Aug. 25, 1989 [FR] France ............................ 89 11360

[51] Int. Cl.[5] .................... B01D 33/052; B30B 9/24

[52] U.S. Cl. .................................. 210/401; 209/307

[58] Field of Search .................... 210/401, 400, 160; 162/348, 358, 381; 100/118-120, 151-154, 222; 209/307

[56] References Cited

U.S. PATENT DOCUMENTS 2,057,312 10/1936 Richardson .
3,381,609 5/1968 Malarkey .......................... 210/401
3,605,607 9/1971 Gujer ................................ 210/401

FOREIGN PATENT DOCUMENTS 632099 5/1963 Belgium .
0299765 7/1988 European Pat. Off. .
472419 10/1926 Fed. Rep. of Germany .
2166552 11/1971 Fed. Rep. of Germany .
2421955 5/1974 Fed. Rep. of Germany .
498925 5/1919 France .
601270 7/1925 France .
746330 2/1932 France .
1096275 1/1954 France .
1199269 12/1957 France .
1526592 6/1967 France .
2002087 2/1969 France .
2066083 10/1970 France .
2331365 11/1976 France .
2442799 12/1978 France .
2580946 4/1985 France .
5832600 8/1981 Japan .
13656 of 1910 United Kingdom .

*Primary Examiner*—Frank Sever
*Attorney, Agent, or Firm*—Skjerven, Morrill, MacPherson, Franklin & Friel

[57] ABSTRACT

The press comprises a pair of moving endless filter bands having two parallel lengths sandwiching material to be dehydrated and clamped between two presser plates each of which acts against a corresponding one of the lengths of band via a respective moving endless belt. Each presser plate is associated with at least one endless bearing chain carrying a series of wheels which are free to rotate and which are interposed between the presser plates and the associated endless belt.

8 Claims, 4 Drawing Sheets

DEHYDRATION PRESS

The present invention relates to a dehydration press, i.e. a press for extracting a liquid contained in a liquid/-solid suspension, which suspension may be in the form of a paste or a semi-liquid sludge.

BACKGROUND OF THE INVENTION

Examples of the uses to which such a press may be put include: sludge treatment in sewage works; drying peat; dewatering fibrous or cellulose materials in paper-making installations; and extracting juice from fruit to vegetable pulp.

The invention relates more particularly to a filter band press having a pair of porous endless bands that are moved continuously and are disposed to receive and press between them the material which is to be dehydrated. Presses of this nature are described, for example, in French patent documents FR-A-2 066 083, FR-B-2 580 946, and FR-A-1 526 592.

Document FR-A-1 526 592 describes a fruit press in which the filter bands present two parallel strands which sandwich the material to be dehydrated, in particular pieces of fruit or vegetables. These two strands extend horizontally and are themselves clamped between two presser plates constituted by frames carrying thrust rollers. Each presser plate acts against the associated length of band via a moving endless belt.

The side of the belt that presses against the filter band has a series of grooves hollowed out therein for removing the liquid which is extracted by pressing the cake which is imprisoned between the two bands, which liquid passes through the pores in the adjacent filter band. Appropriate sealing means are provided along the longitudinal edges of the filter bands for keeping the material between them.

In a variant, the endless belt is constituted by a series of pressing shoes which are hinged to one another like a crawler track.

This kind of press generally gives satisfaction in common applications, in particular when pressing fruit, since low or moderate pressure (about 5 bars) suffices for obtaining the desired extraction.

However, it is not suitable for applications where it is necessary to subject the cake material to pressures which are high or very high, about 50 bars or more. If the pressure is very high, then problems arise with driving the bands and the cake because of the high friction which is developed between the stationary parts and the moving parts. There is also the question of premature damage and wear of the moving parts, in particular of the filter bands. In some applications it is desirable to make these bands from a fine texture substance, e.g. linen cloth, which does not necessarily have good mechanical characteristics, in particular high traction strength.

Unfortunately, the biological purification treatment methods that are used in sewage works are producing sludges that are more and more difficult to dehydrate by conventional means at satisfactory cost. In addition, international standards concerning waste are changing to require ever higher dry contents, generally higher than 30%, without significant addition of other substances such as lime or carbon-based bulking agents such that the needs for high performance dedhydrating presses operating at high or very high pressure are becoming felt more and more strongly on the market.

That is why one of the objects of the present invention is to provide a press of the above-mentioned type which is capable of operating at considerably higher pressures than those that have been obtainable in the past, but without major modification to this type of press.

Another object of the invention is to propose a press whose structure is simple and robust, in which the various components are protected from premature damage or wear.

Another object is to provide a press which is easy to use and which is capable of operating at high throughput.

SUMMARY OF THE INVENTION

The dehydration press of the invention is of the type comprising a pair of moving endless filter bands having two approximately parallel lengths sandwiching the material to be dehydrated and clamped between two presser plates each of which acts against a corresponding one of the lengths of band via a moving endless belt, sealing means being provided along the edges of said lengths of band in order to confine the material therein.

According to the invention, each of the presser plates is associated with at least one endless bearing chain, and preferably with a plurality of endless bearing chains which are disposed parallel to one another and which are driven together, the chains including a series of wheels which are free to rotate and which are interposed between the presser plate and the endless belt.

The wheels which are interposed between each of the presser plates and the associated endless belt are thus capable of transmitting pressure forces without giving rise to damage, and since the chains are motor driven, of simultaneously transmitting drive to the endless belt against which they are pressed. Simultaneously they therefore drive or facilitate the driving of the filter band which tends to adhere to the associated moving belt by virtue of the pressure, thereby also driving the cake or facilitating the driving thereof.

In a preferred embodiment of the invention, each of the belts is in the form of a crawler track, being constituted by a set of plane shoes which are hinged to one another about axes that are perpendicular to the direction of belt advance.

Advantageously, the press is provided with means for providing relative guidance between the chains and the associated belt in their direction of displacement; these means may be constituted, for example, by elongate blocks fixed to at least some of the shoes constituting the crawler track and projecting between two adjacent chains.

Advantageously, each presser plate carries a series of rails for guiding the wheels of each of the bearing chains.

The sealing means provided at the edges of the lengths of band may be constituted merely by folding one of the bands under the other through 180°.

BRIEF DESCRIPTION OF THE DRAWINGS

An embodiment of the invention is described by way of example with reference to the accompanying drawings, in which.

DETAILED DESCRIPTION

Figure 1A:
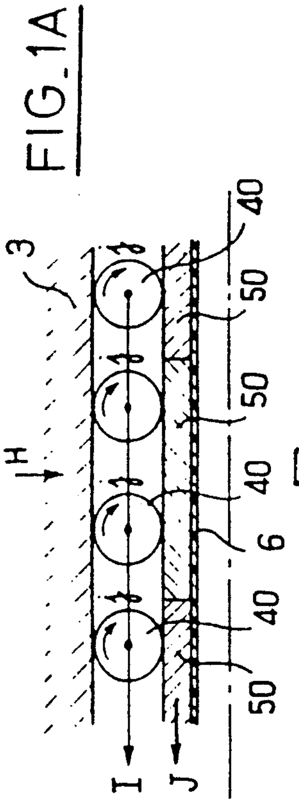
FIG. 1A is a detail view for showing how the belt is driven by means of a driving chain.

The press shown in FIGS. 1 to 5 comprises a stand 1 comprising a bottom slab 10, a top slab 11, and vertical uprights 12.

Two presser plates are disposed between the slabs 10 and 11: a bottom presser plates 2 and a top presser plate 3. These plates may be constituted, for example, by I-section girders disposed longitudinally (parallel to the plane of FIG. 1) and welded together. Appropriate guide means (not shown) are provided to guide each of the presser plates 2, 3 vertically downwards or upwards inside the stand. These means also allow at least one of the two presser plates to pivot slightly in the longitudinal direction so that the plates converge towards each other on going from right to left in FIG. 1.

Each of the presser plates 2, 3 is capable of being displaced vertically by hydraulic actuators.

The top plate 3 is driven by four double-acting actuators 30 disposed at the corners of a rectangle and mounted on the top slab 11.

The bottom plate 2 is made up of three independent lengths 201, 202, and 203 capable of being actuated independently, each by means of its own four actuators 20 carried by the bottom slab 10.

The press is fitted with two endless filter bands given the reference 6, with the top band being referenced 6*a* and the bottom band 6*b*. Each of these bands has a horizontal rectilinear length 63 which passes between the two presser plates 2 and 3. Between these presser plates, the two lengths 63*a* and 63*b* are situated a short distance apart from each other and they are approximately parallel. In conventional manner, these two bands are guided by deflection rolls 62 mounted to rotate in appropriate bearings fixed to the press stand.

The filter bands are made of a porous material having very fine pores and which is not very permeable (because of the high pressures involved). Practice has shown that cloth made of fibrous material, either natural fibers such as linen, or synthetic or inorganic fibers such as glass fibers, is suitable in numerous applications.

Figure 1:
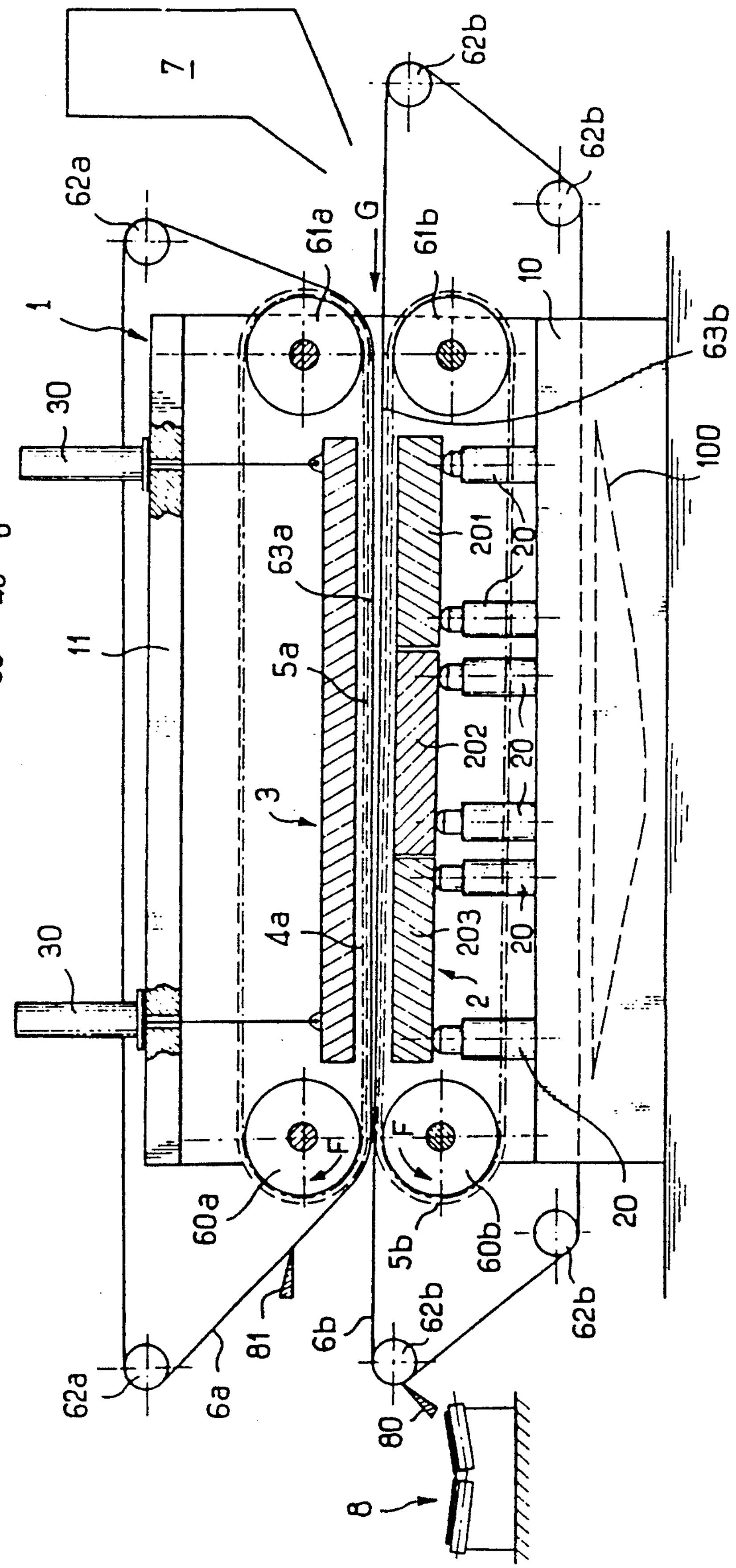
FIG. 1 is a diagrammatic side view, partially in section of a press of the invention.
Figure 2:
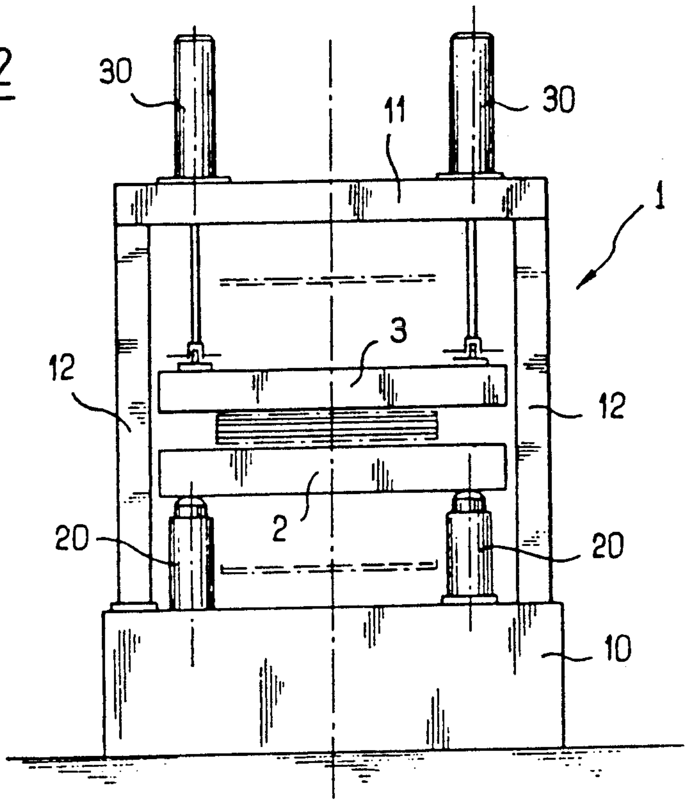
FIG. 2 is a diagrammatic end view corresponding to FIG. 1.

The lengths of band 63 move from right to left in FIG. 1, in the direction of arrow G.

As is well known, the upstream portion of the bottom length 63*b* passes under a hopper 7 which dispenses the substance to be dehydrated.

A conveyor 8, e.g. a conveyor belt, is provided at the downstream end of the filter bands in order to receive and remove the dehydrated substance. Scraper members 80 and 81 for scraping the bands are advantageously provided at said end, together with appropriate cleaning devices (not shown).

In conventional manner, a sump 100 is disposed in the bottom slab 10. The sump is intended to collect the liquid which passes through the filter bands during the pressing process that takes place between the two plates 2 and 3.

Each of the endless bands 6 has its horizontal length 63 bearing against a short endless belt. The top and bottom belts are given respective references 5*a* and 5*b* in FIG. 1 where they are shown by dashed lines.

According to an essential characteristic of the invention, the press is provided with two series of bearing chains 4*a* and 4*b*. Each of these series is disposed inside a corresponding one of the belts 5*a* and 5*b*. These series are represented in FIG. 1 by dot-dashed lines.

Each series comprises a plurality of identical chains disposed in parallel with one another and passing over a series of deflection sprocket wheels 60, 61 mounted respectively at the upstream and downstream ends of the stand 1. The downstream wheels 60 are fixed to a common transverse horizontal shaft which is driven to rotate at continuous and uniform speed by a motor and gear box unit controlled by a speed controller. The top and bottom sets of chains 4*a* and 4*b* may both be driven by a single motor via an appropriate transmission, or else each may be driven by an independent motor such that they move together at the same speed between the two presser plates 2 and 3. The rotation of the driving wheels 60*a* and 60*b* are shown in FIG. 1 by arrows F. The upstream sets of wheels 61*a* and 61*b* are not driven, but are free to rotate.

Figure 3:
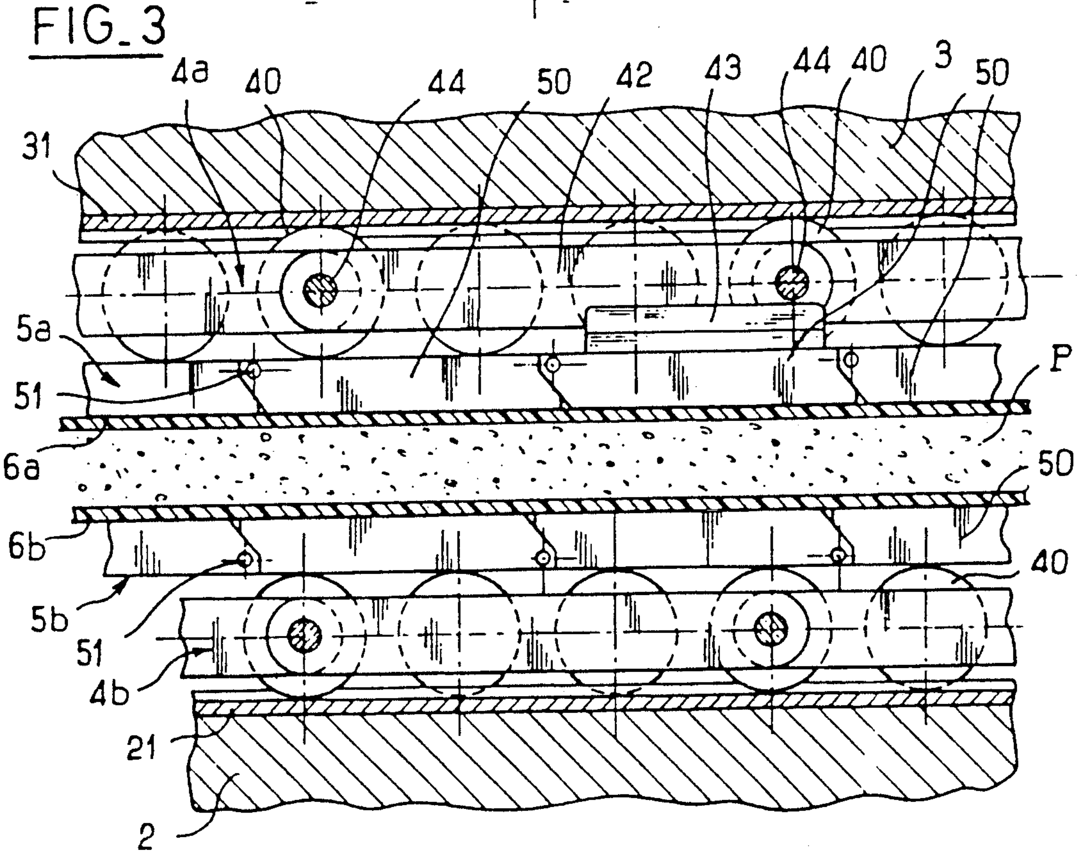
FIGS. 3 and 5 are respectively a longitudinal section and a cross-section through the pressing zone.
Figure 4:
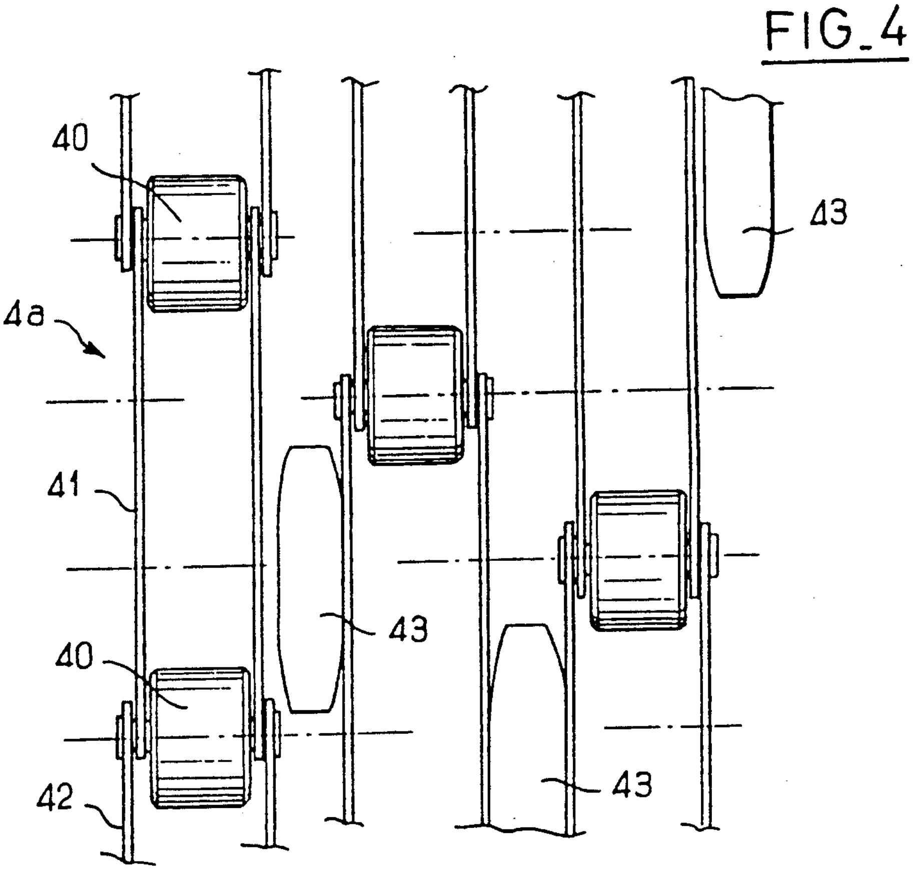
FIG. 4 is a diagrammatic plan view corresponding to plane IV—IV of FIG. 5.
Figure 5:
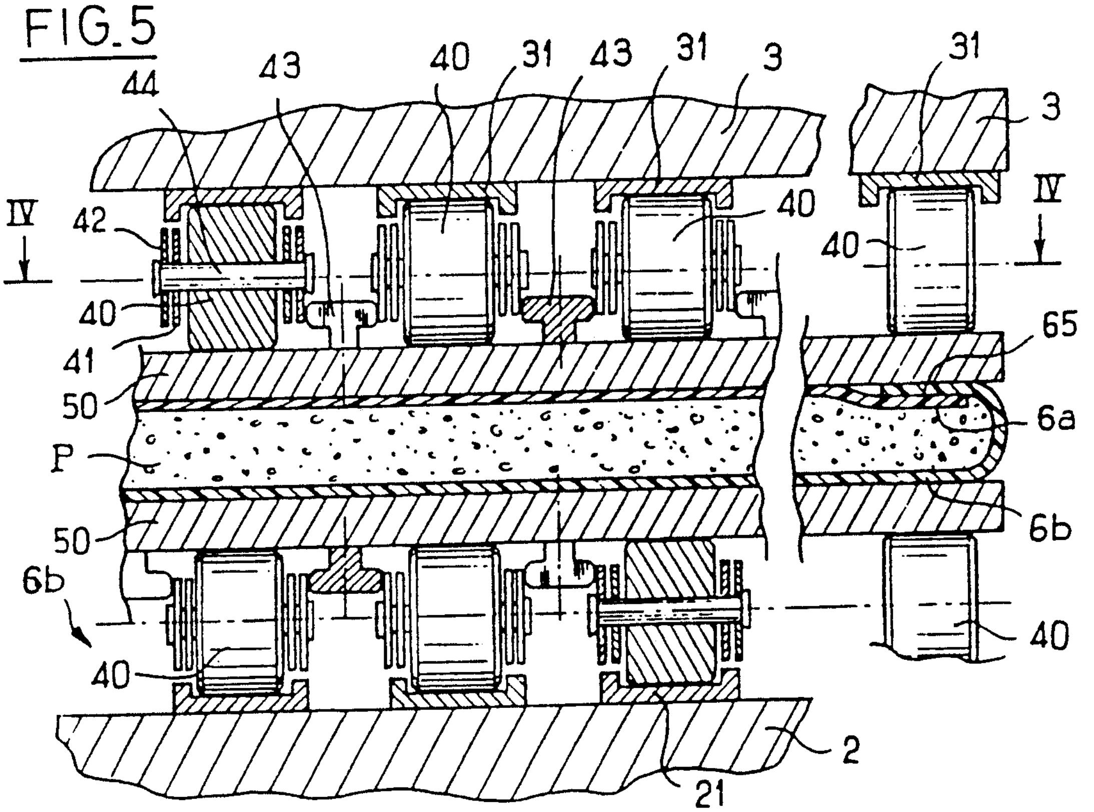

As can be seen more particularly with reference to FIGS. 3, 4, and 5, the bearing chains 4 are preferably goods-handling chains in accordance with international standard ISO 1977. They are made up of bearing wheels 40 interconnected by side links 41, 42. The bearing wheels 40 are carried on axles 44 and are free to rotate thereon.

The bearing chain is of the same type as described in French patent No. 2 512 135.

It may be observed that each chain is offset longitudinally relative to the adjacent chains so that the wheels are uniformly distributed over the horizontal plane, thereby obtaining a uniform distribution of thrust pressure exerted by the associated presser plate.

Each of the bearing chains is guided in the longitudinal direction by rails 21, 31 fixed to the presser plates 2 or 3 respectively, e.g. by means of screws.

The moving belts 5 are in the form of crawler tracks. They are made up of an assembly of rectangular shoes 50 which are hinged to one another about transverse axes 51. As can be seen in FIG. 3, the adjacent edges of two adjacent shoes are preferably chamfered in complementary manner so as to ensure that forces are properly transmitted from one shoe to the next, while still enabling them to pivot relative to one another when the belt goes round the end sprocket wheels 60 and 61 together with the chains.

Some of the shoes carry respective elongate blocks 43 which are shaped and positioned to come between the links of two adjacent chains in order to ensure that the belts 5 are stable in the transverse direction. The blocks may be T-shaped, for example (see FIG. 5), with the ends of the cross-bar of the T-shape coming into contact with the chain links.

Each of the filter bands 6*a*, 6*b* is in contact with the shoes 50 of the corresponding one of the belts 5*a* and 5*b*.

In order to allow liquid to flow and be removed as it is extracted from the material being treated, given a reference P in FIGS. 3 and 5, liquid flow channels are provided in the walls of the shoes 50. These channels consist in holes passing through the shoes and/or in grooves suitable for directing the extracted liquid to the sides of the press. Thus, it is possible to provide holes through the shoes constituting the bottom belt 5_b_ with the liquid then flowing under gravity through the shoes and dropping into the sump 100. The shoes 50 of the top belt 5_a_ may be provided with transverse or oblique grooves which direct liquid to the sides of the press where additional means may be provided for conveying this liquid under gravity into the sump 100.

Means are provided along the edges of the filter bands 6_a_ and 6_b_ to provide sealing therealong. Various means may be provided, e.g. based on the teaching of above-specified Document FR-A-1 526 592.

In the embodiment shown, sealing is obtained merely by the bottom band 6_b_ being wider than the top band 6_a_ with its projecting margin 65 being folded upwards and inwards so as to lie under the top band, with the margin being held in place by being pinched between the shoes 50 and said top band (see FIG. 5).

In the pressing zone, the two bands 6_a_ and 6_b_ therefore form a pocket within which the material being treated is confined.

The margins of the filter bands may be reinforced, e.g. they may be made of cloth which is less porous but stronger than that of the remainder of the bands, thereby enabling them to withstand the large pressures that are developed inside the pocket without risk of tearing, which pressures tend to thrust the material sideways against the sides of the press.

The two filter bands 6_a_ and 6_b_ may optionally be driven positively in the same direction as the chains (in the direction of arrows G), but at twice the speed of the chains for a reason explained below.

In order to drive the bands, appropriate motors (not shown) are provided for driving some of the deflection rolls 62_a_ and 62_b_.

The above-described dehydration press operates as follows.

The actuators 30 are actuated initially to lower the presser plate 3 and to bring it into contact with the top bearing chain 4_a_.

The function of the actuators 30 is to enable the top presser plate to move quickly which can be useful, for example, for cleaning the press and/or for maintenance work. They are not intended to control the clamping pressure applied to the bands, with this function being performing by the actuators 20 which act on the bottom presser plate 2.

The actuators 20 are then actuated so as to bring the various lengths 201, 202, and 203 to the desired distance from the top plate. These displacements take place over small amplitudes such that the various items interposed between the presser plates, namely the filter bands, the chains, and the moving belts, do not interfere with the displacements, given that all of the said elements possess a degree of flexibility.

The bottom actuators 20 are actuated so that the two facing faces of the plates 2 and 3 are consequently the two lengths 63_a_ and 63_b_ of the filter bands converge very slightly in the direction of travel G of the material being pressed.

By way of example, this angle of convergence may be less than 1°, with the gap between the two lengths 63_a_ and 63_b_ varying from 30 mm at the upstream end to 15 mm at the downstream end.

Each of the lengths 201, 202, 203 is preferably subjected to different thrust so that the pressure within the cake rises progressively.

By way of example, the pressure may be about 5 bars to 15 bars over the first length 201, 15 bars to 30 bars over the second length 202, and 30 bars to 50 bars over the third and last length 203.

The material to be treated, e.g. sludge from a sewage works, is poured continuously from the hopper 7. Conventional means are provided to ensure that the material is spread more or less uniformly over the entire width of the bottom band 6_b_.

The material is transported continuously between the presser plates 2 and 3 where it is compressed under high pressure between the two filter bands 6_a_ and 6_b_.

As shown in FIG. 1A, the vertical force H exerted by each of the presser plates (with the top plate 3 being shown in FIG. 1A) is transmitted to the associated filter band 6 via the bearing wheels 40 and the shoes 50.

Since the chain supporting the shoes 50 is displaced positively, the bearing wheels 40 run over the presser plate and rotate about their own axes (arrow j). because the force H is large, the friction between the bearing wheels and the shoes 50 is sufficient to drive the shoes 50 (arrow J). This drive takes place in the same direction as the chain displacement direction but at twice the chain displacement speed. The line of contact between a bearing wheel and a shoe is subjected to the combination of two equal-velocity motions, namely the advance motion of the chain and the tangential motion of the wheel rotating about its own axis.

Because of the working pressure, each of the filter bands adheres to the moving belt which is associated therewith and it moves together therewith, thereby entraining the cake which is imprisoned between the two bands. As a general rule, this adherence suffices for driving the filter bands 6_a_ and 6_b_. However, as mentioned above, the filter bands may be driven positively (at twice the velocity of the chains), thereby facilitating displacement thereof, particularly when empty. These bands are not subjected to any significant traction or shear forces and they therefore operate under excellent conditions.

On passing between the presser plates, the cake is subjected to a progressively increasing compression force, thereby extracting the liquid contained in the cake through the filter bands, with the liquid being collected in the sump 100.

The dehydrated material is detached from the filter band to which it tends to adhere by means of the scrapers 81 and 80, and it is deposited onto the conveyor 8 which conveys it either to a storage area or else to a machine for subsequent treatment.

By way of example, each of the pressing zones corresponding to respective ones of the lengths 201, 202, 203 may be about 2 meters (m) long, thereby giving a total pressing length of 6 m. The bands may be about 1 m to about 1.5 m wide depending on the desired press capacity. The number of bearing chains associated with each of the presser plates should be as large as possible, e.g. 10 for a width of 1 m. The wheels 40 may be 70 mm in diameter, for example.

The chains and the girders constituting the presser plates are preferably made of hard steel treated to withstand the high pressures developed by the press without deforming.

Naturally, the bottom presser plate 2 may be made as a single piece (rather than being built up of independent lengths).

Only one of the two presser plates (e.g. the bottom plate) need be a moving plate, and the other plate may be stationary. In this case, the means for controlling the moving plate could consist, in a variant embodiment, in a toggle action or hinged parallelogram force-multiplying system actuated by an actuator.

Figure 6:
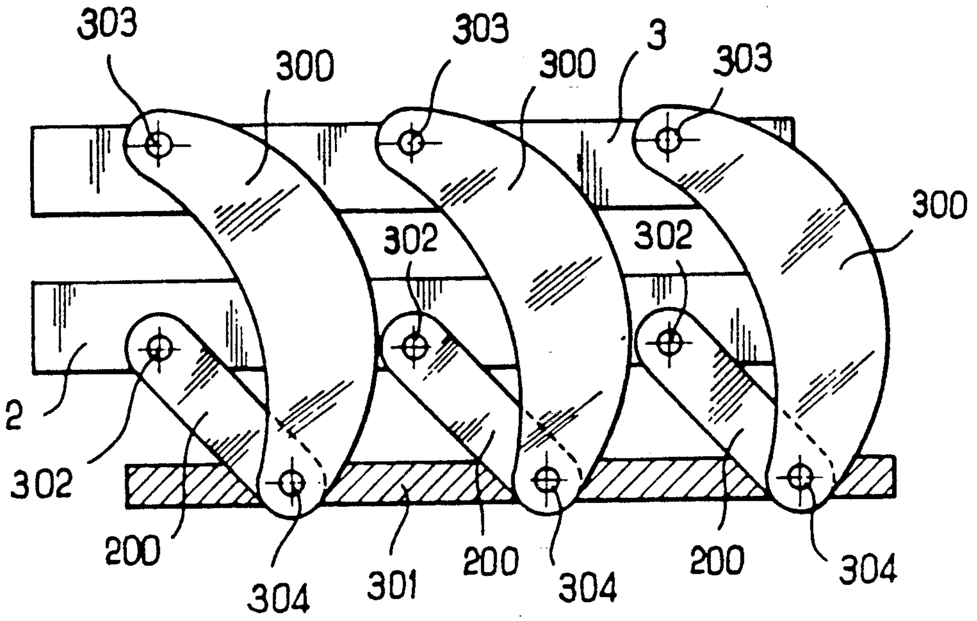
FIGS. 6 and 7 are diagrams showing a variant drive mechanism for the presser plates, with the plates being shown respectively in the spaced-apart position (disengaged stage) and the close-together position (pressing stage).
Figure 7:
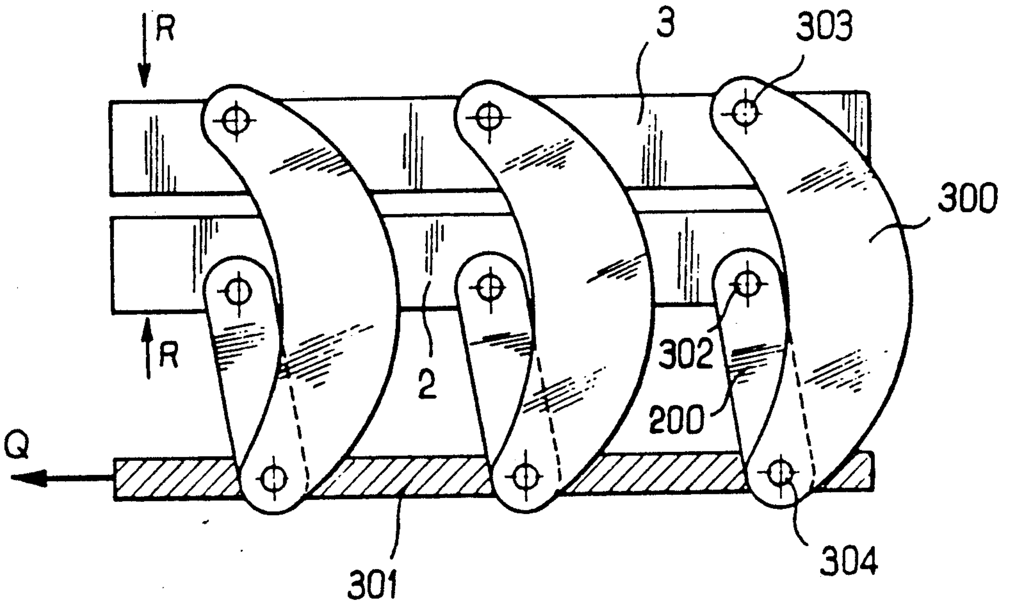

In the variant shown diagrammatically in FIGS. 6 and 7, the vertical displacement of the two presser plates 2 and 3 is obtained by horizontal displacement of a control member 301. Two series of connecting rods 300, 200 are provided on each side of the press, with the connecting rods in each series being hinged at one end to a corresponding one of the plates 3, 2 about respective axes 303 and 302. The opposite ends of these connecting rods are hinged about common axes 304 to the control member 301 which is actuated by an actuator (not shown). The control member 301 is disposed beneath the bottom plate 2 and the connecting rods 300 connecting it to the top face 3 are arcuate in shape. The axes 303 and 302 are situated in the same vertical plane, and during the pressing stage the axis 304 also tends to approach said plane. By virtue of this disposition, a relatively low traction force Q on the member 301 enables a pressing force R to be developed which is extremely high at the end of the stroke.

In order to reduce the risk of the folded-over margin 65 of the filter band 6*b* unfolding under the effect of pressure from the cake, one of the two presser plates may be provided with longitudinally-extending abutments, e.g. made of a plastic material having a low coefficient of friction (such as polytetrafluoroethylene, PTFE), thereby supporting the edges of the bands.

In a variant, the crawler track belt may be guided relative to the chains by means of longitudinal grooves formed in the backs of the shoes with the wheels of the chains running therein.

The various shoes constituting the crawler tracks may be connected to one another directly via pins, or else by different connecting elements, e.g. chains or cables.

A press of the invention may advantageously be disposed downstream from a conventional press, in particular of the type described in above-mentioned Document FR-B-2 580 946, which press will have already raised the dry matter content of the material from about 3% to about 15%. Without there being any need to add substance between the two presses, the press of the invention is then capable of raising the dry matter content from about 15% to about 30%. The resulting dehydrated product is in the form of a very fine layer which is easy to dry subsequently, e.g. in a conventional drying tunnel.

I claim:

1. A dehydration press of the type comprising a pair of moving endless filter bands having two approximately parallel lengths sandwiching the material to be dehydrated and clamped between two presser plates each of which acts against a corresponding length of one of the filter bands via a crawler track comprising a set of plane shoes which are hinged to one another about axes that are perpendicular to the direction of the crawler track advance, sealing means being provided along the edges of said lengths of the filter bands in order to confine the material therein, wherein each presser plate is associated with a plurality of endless bearing chains disposed parallel to one another and driven together, each of said bearing chains having a series of wheels which are free to rotate and which are interposed between respective ones of said presser plates and the crawler tracks.

2. A press according to claim 1, wherein the filter bands are made of fibrous cloth, e.g. a linen cloth.

3. A press according to claim 1, provided with means for providing relative guidance between the chains and the associated crawler track in their direction of displacement.

4. A press according to claim 1, wherein each presser plate carries a series of rails for guiding the wheels.

5. A press according to claim 1, wherein the two strands of filter band converge slightly towards each other in the advance direction of the bands.

6. A press according to claim 1, wherein each of the presser plates is a moving plate, each being displaced by a corresponding series of hydraulic actuators.

7. A press according to claim 6, wherein one of said presser plates is built up from a plurality of independent lengths which are individually displaceable by the actuators, thereby making it possible to obtain zones of increasing pressure in the advance direction of the filter bands.

8. A press according to claim 1, wherein said sealing means are constituted by the margin of one of the bands being folded through 180° to lie under the other band.

* * * * *